United States Patent
Hennessey et al.

(10) Patent No.: US 9,982,696 B1
(45) Date of Patent: May 29, 2018

(54) ADAPTER FOR MICROPHONE STAND AND METHOD OF USE

(71) Applicant: The Music People, Inc., Berlin, CT (US)

(72) Inventors: James R. Hennessey, West Hartford, CT (US); Leann Morgan, Meriden, CT (US)

(73) Assignee: The Music People, Inc., Berlin, CT (US)

( * ) Notice: Subject to any disclaimer, the term of this patent is extended or adjusted under 35 U.S.C. 154(b) by 0 days. days.

(21) Appl. No.: 15/411,273

(22) Filed: Jan. 20, 2017

(51) Int. Cl.
*F16B 7/18* (2006.01)
*F16M 11/00* (2006.01)

(52) U.S. Cl.
CPC .............. *F16B 7/182* (2013.01); *F16M 11/00* (2013.01)

(58) Field of Classification Search
CPC . F16B 7/18; F16B 7/182; F16B 9/026; F16M 11/00; F16M 11/28; F16M 11/16; F16M 11/24; F16M 11/26; A47B 19/002; Y10T 403/55; Y10T 403/556
See application file for complete search history.

(56) References Cited

U.S. PATENT DOCUMENTS

| | | | | |
|---|---|---|---|---|
| 4,760,984 A | * | 8/1988 | Hennessey | F16B 21/16 248/121 |
| 8,448,405 B2 | * | 5/2013 | Schaefer | E04C 3/06 52/60 |
| 8,783,975 B1 | * | 7/2014 | Cifers | F16M 11/14 396/428 |
| 2014/0138507 A1 | * | 5/2014 | Hennessey | F16M 13/022 248/276.1 |

* cited by examiner

*Primary Examiner* — Daniel J Wiley
(74) *Attorney, Agent, or Firm* — Whitmyer IP Group LLC

(57) ABSTRACT

An adapter for connecting a shaft of a microphone stand to a microphone accessory. The adapter including a lug having a body, a first post, and a second post; a cap with a bore, a first end defining a first opening in communication with the bore, a second end defining a second opening in communication with the bore, and an internal threaded portion; a shaft with a distal end and a wall defining a bore, the external surface of the shaft including a threaded portion proximate to the distal end of the shaft. The threaded portion of the shaft is adapted to threadably engage with the internal threaded portion of the cap such that the lug disposed between the cap and the shaft is compressed between the shaft and the cap causing it to be rotatably fixed about the lug axis relative to the shaft.

20 Claims, 6 Drawing Sheets

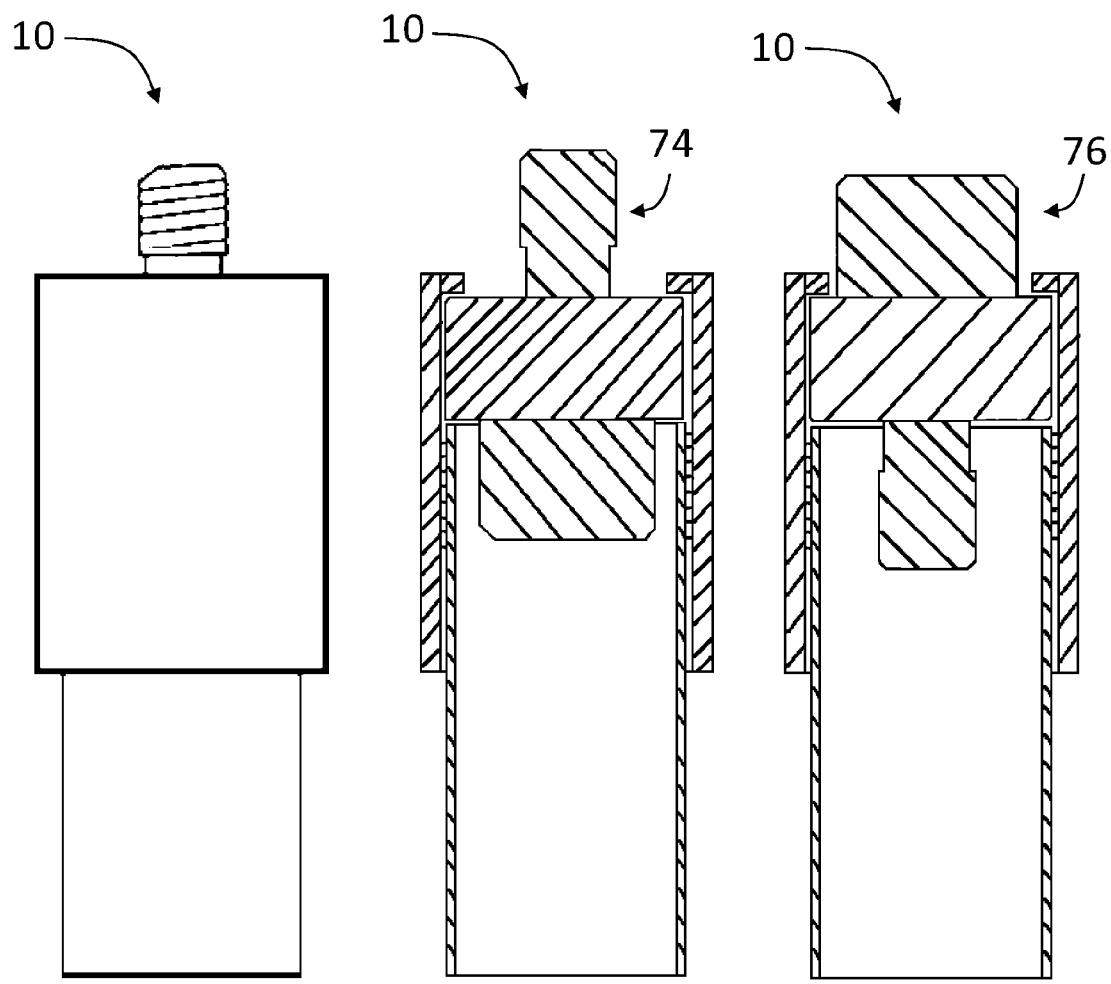

ADAPTER FOR MICROPHONE STAND AND METHOD OF USE

TECHNICAL FIELD

The present disclosure generally relates to an adapter for a microphone stand and method of using the same, and more particularly to an adapter for connecting the upper shaft of the microphone stand to a microphone accessory.

BACKGROUND

Microphone accessories are generally attachable to the upper shaft of a microphone stand via an externally threaded post at the top of the upper shaft of the microphone stand, which typically mates with an internally threaded microphone accessory. Different countries adhere to different standards for the threading, which often results in situations where a particular microphone accessory cannot be attached to a particular stand, or multiple pieces of equipment are needed to attach one to the other. In particular, the EU generally adheres to a ⅜"-16 TPI (threads per inch) standard, while the U.S. and China adhere to a ⅝"-27 TPI standard.

Aspects of the present invention are directed to these and other problems.

SUMMARY

According to an aspect of the present invention, an adapter for connecting an upper shaft of a microphone stand to a microphone accessory is provided. The adapter includes a lug having a body extending along a lug axis between a first end and a second end and having a body diameter in a plane perpendicular to the lug axis, a first post extending from the first end having a first post diameter in a plane perpendicular to the lug axis and having a threaded portion, a second post extending from the second end having a second post diameter in a plane perpendicular to the lug axis and having a threaded portion. The adapter also includes a cap extending along a cap axis between a first end and a second end, the cap having a wall defining a bore extending in a direction of the cap axis, the first end defining a first opening in communication with the bore and having a first opening diameter, the second end defining a second opening in communication with the bore and having a second opening diameter, the wall having an internal threaded portion. The adapter also includes a shaft extending along a shaft axis and having a distal end, the shaft having a wall defining a bore extending from an opening in the distal end of the shaft in a direction of the shaft axis and having a shaft bore diameter, an external surface of the shaft having an external threaded portion proximate to the distal end of the shaft adapted to threadably engage with the internal threaded portion of the cap when the distal end of the shaft is received in the bore of the cap through the second opening of the cap. The body diameter of the lug is greater than the first opening diameter of the cap and is greater than the bore diameter in the distal end of the shaft, so that when the lug is disposed between the cap and the shaft, and the shaft is threadably engaged with the cap, the lug is compressed between the distal end of the shaft and the first end of the cap so that the lug is rotatably fixed about the lug axis relative to the shaft.

According to another aspect of the present invention, an adapter for connecting a microphone shaft to a microphone accessory is provided. The adapter includes a lug having a body extending along a lug axis between a first end and a second end and having a body diameter in a plane perpendicular to the lug axis, a first post extending from the first end having a first post diameter in the plane perpendicular to the lug axis and having a threaded portion, a second post extending from the second end having a second post diameter in the plane perpendicular to the lug axis and having a threaded portion. The adapter also includes a cap extending along a cap axis between a first end and a second end, the cap having a wall defining a bore extending in a direction of the cap axis and having a bore diameter, the first end defining a first opening in communication with the bore and having a first opening diameter, the second end defining a second opening in communication with the bore and having a second opening diameter, the wall having an internal threaded portion. The body diameter of the lug is greater than the first opening diameter of the cap and is less than the bore diameter of the cap so that the lug may be inserted into the bore of the cap through the second opening of the cap and the body of the lug is pressed against the first end of the cap.

According to another aspect of the present invention, a method of using an adapter is provided. The method includes the steps of placing a lug inside of a cap in a first lug orientation or a second lug orientation, the lug having a body extending along a lug axis between a first end and a second end and having a body diameter in a plane perpendicular to the lug axis, a first post extending from the first end having a first post diameter in the plane perpendicular to the lug axis and having a threaded portion, a second post extending from the second end having a second post diameter in the plane perpendicular to the lug axis and having a threaded portion, the cap extending along a cap axis between a first end and a second end, the cap having a wall defining a bore extending in a direction of the cap axis, the first end defining a first opening in communication with the bore and having a first opening diameter, the second end defining a second opening in communication with the bore and having a second opening diameter, the wall having an internal threaded portion, the first post extending through the first opening of the cap when the lug is in the first lug orientation, the second post extending through the first opening of the cap when the lug is in the second lug orientation. Threadably mating the cap to a shaft, the shaft extending along a shaft axis and having a distal end, the shaft having a wall defining a bore extending from an opening in the distal end of the shaft in a direction of the shaft axis and having a shaft bore diameter, an external surface of the shaft having an external threaded portion proximate to the distal end of the shaft adapted to threadably engage with the internal threaded portion of the cap when the distal end of the shaft is received in the bore of the cap through the second opening of the cap, the body diameter of the lug being greater than the first opening diameter of the cap and being greater than the diameter of the bore in the distal end of the shaft, so that when the lug is disposed between the cap and the shaft, and the shaft is threadably engaged with the cap, the lug is compressed between the distal end of the shaft and the first end of the cap so that the lug is rotatably fixed about the lug axis relative to the shaft. Coupling a first microphone accessory to the lug, the cap, and the shaft when the lug is in the first lug orientation by threadably mating the threaded portion of the first post to an internal threaded portion of the first microphone accessory, or coupling a second microphone accessory to the lug, the cap, and the shaft when the lug is in the second lug orientation by threadably mating the threaded portion of the second post to an internal threaded portion of the second microphone accessory.

In addition to, or as an alternative to, one or more of the features described above, further aspects of the present invention can include one or more of the following features, individually or in combination: the first opening diameter is greater than the first post diameter so that when the lug is disposed in the bore of the cap in a first orientation, the first post extends through the first opening of the cap. The shaft bore diameter is greater than the second post diameter, so that when the lug is disposed in the bore of the cap in the first orientation, and the cap is mated to the shaft, the second post extends into the bore of the shaft. The first opening diameter is greater than the second post diameter so that when the lug is disposed in the bore of the cap in a second orientation, the second post extends through the first opening of the cap. The shaft bore diameter is greater than the first post diameter, so that when the lug is disposed in the bore of the cap in the second orientation, and the cap is mated to the shaft, the first post extends into the bore of the shaft. The lug is disposed in the bore of the cap in the first orientation, and the threaded portion of the first post is threadably mated with an internal threaded portion of a first microphone accessory. The threaded portion of the first post and the internal threaded portion of the first microphone accessory are ⅜"-16 threads per inch. A first washer is disposed around the first post and between the cap and the first microphone accessory, so that when the first microphone accessory is threadably mated to the first post the first washer is compressed between the cap and the first microphone accessory. The lug is disposed in the bore of the cap in the second orientation, and the threaded portion of the second post is threadably mated with an internal threaded portion of a second microphone accessory. The threaded portion of the second post and the internal threaded portion of the second microphone accessory are ⅝"-27 threads per inch. A second washer is disposed around the second post and between the cap and the second microphone accessory, so that when the second microphone accessory is threadably mated to the second post the second washer is compressed between the cap and the second microphone accessory. The first post diameter is equal to the second post diameter.

These and other aspects of the present invention will become apparent in light of the drawings and detailed description provided below.

BRIEF DESCRIPTION OF THE DRAWINGS

FIG. 6A shows a front elevation view of the adapter shown in FIG. 2.

FIG. 6B shows a front cross-sectional view of the adapter shown in FIG. 6A.

FIG. 6C shows a front cross-sectional view of the adapter shown in FIG. 6B with the lug in the opposite orientation.

DETAILED DESCRIPTION

Figure 1:
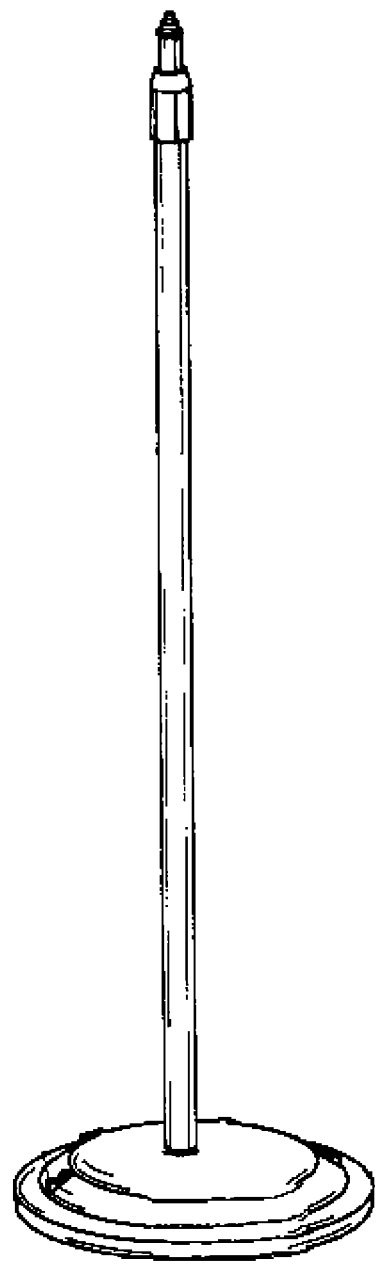
FIG. 1 illustrates a perspective view of a round base microphone stand in accordance with the prior art.
Figure 2:
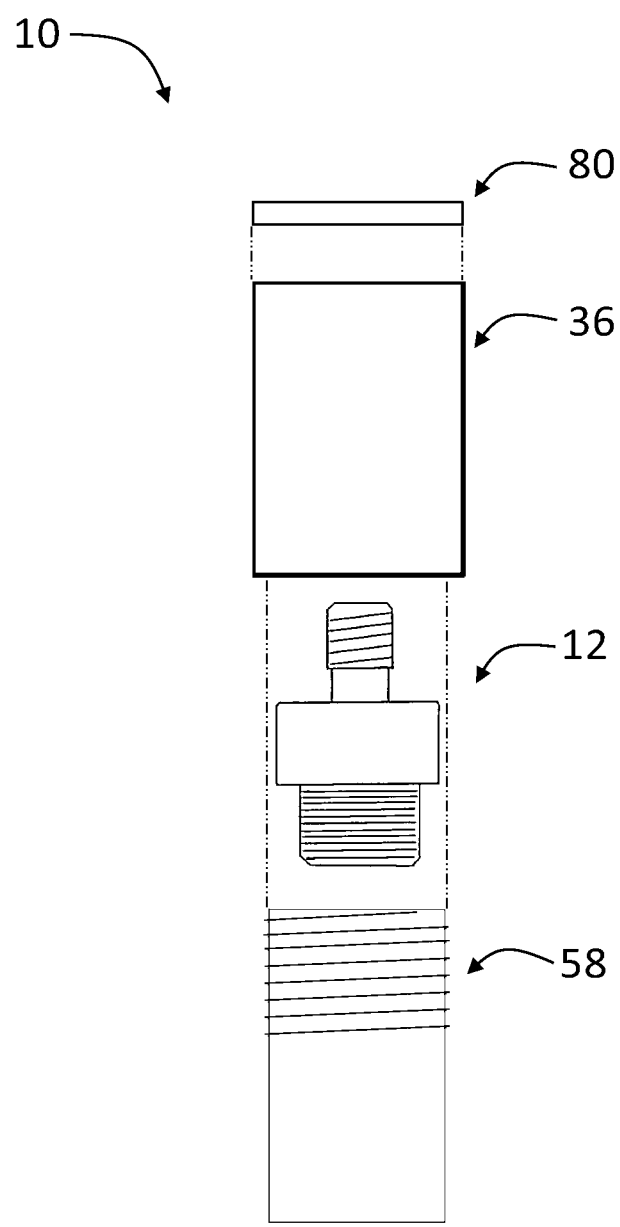
FIG. 2 illustrates an exploded front elevation view of the adapter in accordance with the present disclosure.

Referring to FIG. 2, the present disclosure describes an adapter 10 for connecting the upper shaft of a microphone stand to a microphone accessory. The adapter 10 includes a shaft 58, a lug 12, a cap 36, and a washer 80. When the adapter 10 is assembled, the cap 36 is threadably mated to the shaft 58 with the lug 12 disposed inside the cap 36, and the washer 80 disposed on top of the cap 36.

Figure 3A:
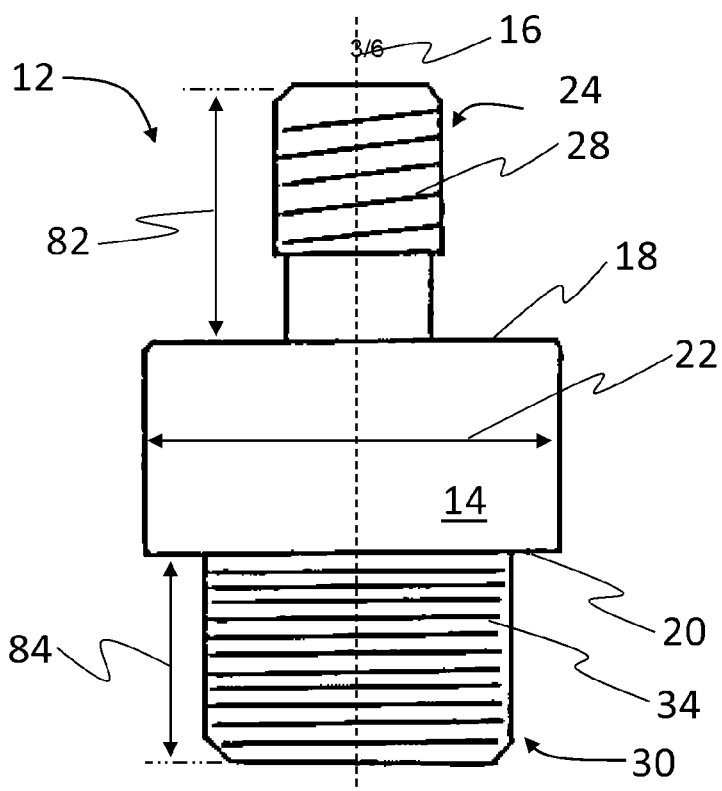
FIG. 3A shows a front elevation view of a lug in accordance with the present disclosure.
Figure 3B:
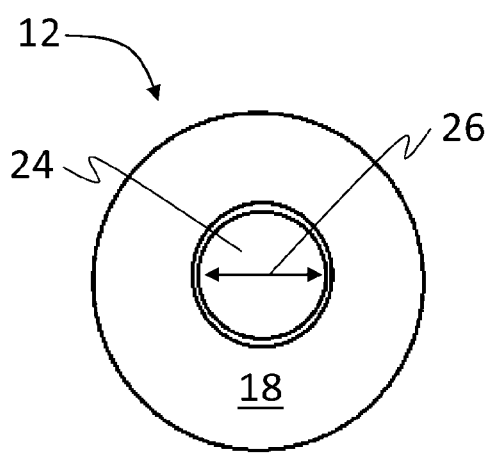
FIG. 3B shows a top plan view of the lug shown in FIG. 3A.
Figure 3C:
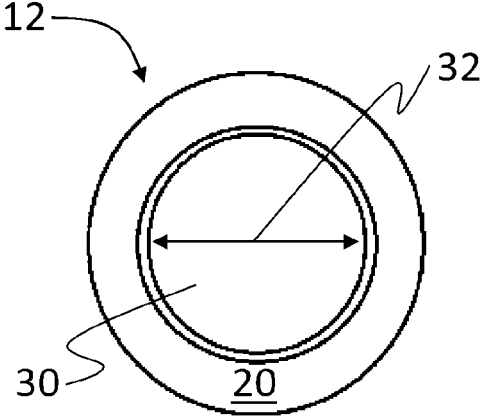
FIG. 3C shows a bottom plan view of the lug shown in FIG. 3A.
Figure 4A:
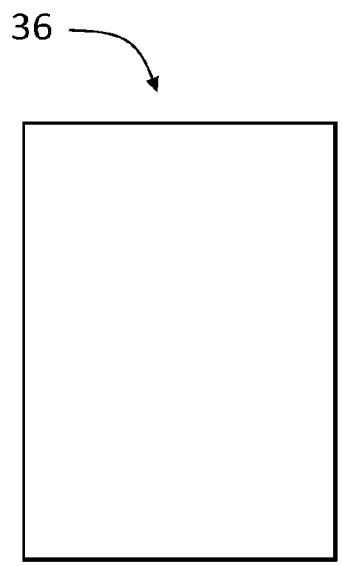
FIG. 4A shows a front elevation view of a cap in accordance with the present disclosure.
Figure 4B:
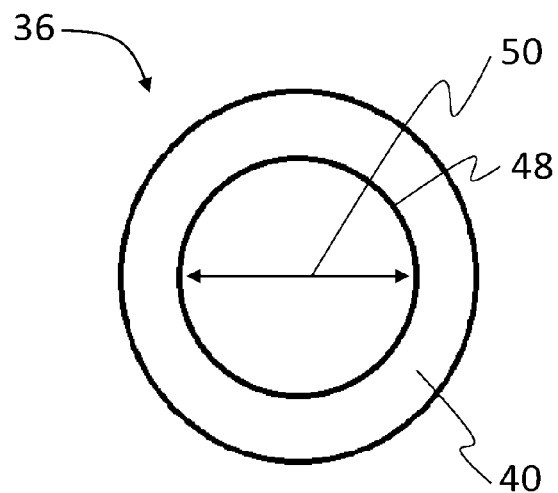
FIG. 4B shows a top plan view of the cap shown in FIG. 4A.
Figure 4C:
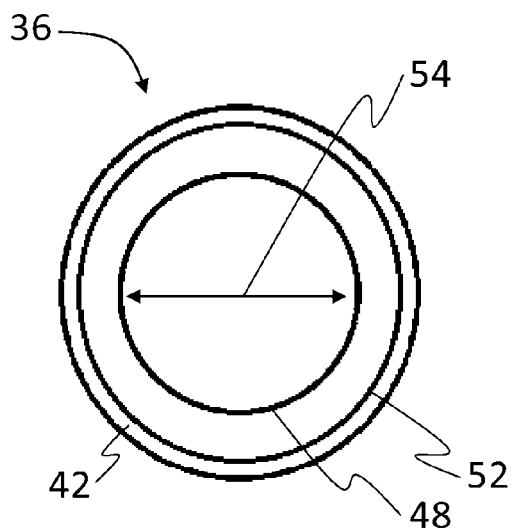
FIG. 4C shows a bottom plan view of the cap shown in FIG. 4A.
Figure 4D:
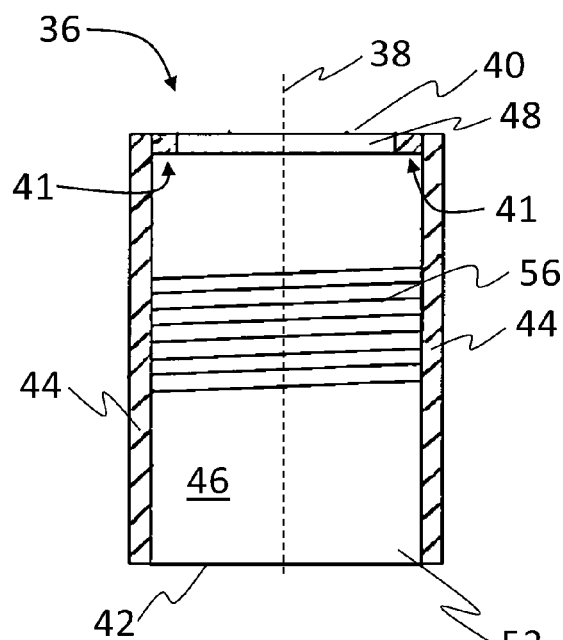
FIG. 4D shows a front elevation cross-sectional view of the cap shown in FIG. 4A.

Referring to FIGS. 3A-3C, the lug 12 has a body 14 extending along a lug axis 16 between a first end 18 and a second end 20. The body 14 has a body diameter 22 in a plane perpendicular to the lug axis 16. The lug 12 has a first post 24 extending from the first end 18. The first post 24 has a first post diameter 26 in a plane perpendicular to the lug axis 16. The first post 24 has a threaded portion 28. The lug 12 also has a second post 30 extending from the second end 20. The second post 30 has a second post diameter 32 in a plane perpendicular to the lug axis 16. The second post 30 has a threaded portion 34. The first post 24 has a first post length 82 and the second post 30 has a second post length 84.

Referring to FIGS. 4A-4D, the cap 36 extends along a cap axis 38 between a first end 40 and a second end 42. The cap 36 has a wall 44 defining a bore 46 extending in a direction of the cap axis 38. The first end 40 of the cap 36 defines a first opening 48 in communication with the bore 46, and the first opening 48 has a first opening diameter 50. The second end 42 defines a second opening 52 in communication with the bore 46, and the second opening 52 has a second opening diameter 54. The wall 44 having an internal threaded portion 56.

Figure 5A:
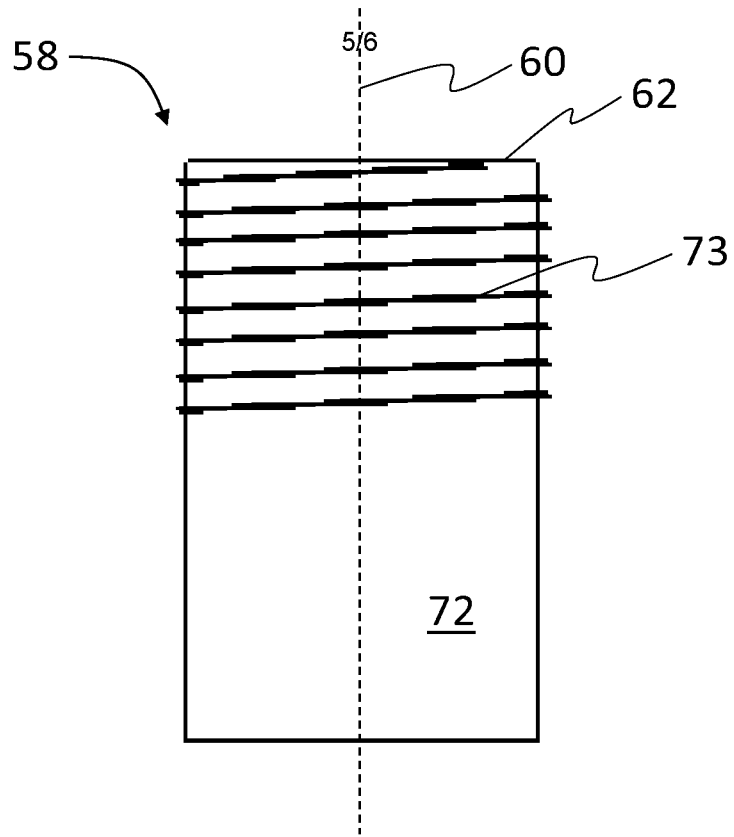
FIG. 5A shows a front elevation view of the distal end of the upper shaft of a microphone stand in accordance with the present disclosure.
Figure 5B:
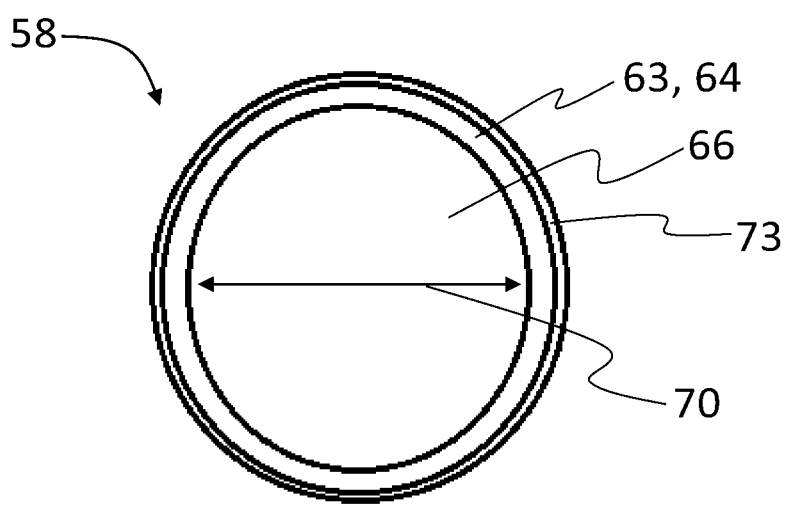
FIG. 5B shows a top plan view of the distal end of the upper shaft of the microphone stand shown in FIG. 5A.

Referring to FIGS. 5A-5B, the shaft 58 extends along a shaft axis 60 and has a distal end 62. The shaft 58 has a wall 64 defining a bore 66 extending from an opening 68 in the distal end 62 of the shaft 58 in a direction of the shaft axis 60. The bore 66 of the shaft 58 has a bore diameter 70. An external surface 72 of the shaft 58 has an external threaded portion 73 proximate to the distal end 62 of the shaft 58, which is adapted to threadably engage with the internal threaded portion 56 of the cap 36 when the distal end 62 of the shaft 58 is received in the bore 46 of the cap 36 through the second opening 52 of the cap 36.

Referring to FIGS. 2-6, the body diameter 22 of the lug 12 is greater than the first opening diameter 48 of the cap 36, and the body diameter 22 of the lug 12 is also greater than the bore diameter 70 in the distal end 62 of the shaft 58, so that when the lug 12 is disposed between the cap 36 and the shaft 58, and the shaft 58 is threadably engaged with the cap 36, the lug 12 is compressed between the distal end 62 of the shaft 58 and the first end 40 of the cap 36 so that the lug 12 is rotatably fixed about the lug axis 16 relative to the shaft 58. Specifically, when the cap 36 is threadably mated with the shaft 58, the internal threaded portion 56 of the cap 36 is threadably connected to the external threaded portion 73 of the shaft 58 while the lug 12 is disposed inside the cap 36, and as the cap 36 is tightened onto the shaft 58 via rotation, the lug 12 is squeezed between the top surface 63 of the wall 64 on the distal end 62 of the shaft 58, and the bearing surface 41 of the first end 40 of the cap 36. The compression of the lug 12 creates friction between the top surface of the body 14 of the lug 12 and the bearing surface 41 of the first end 40 of the cap 36, as well as between the bottom surface of the body 14 of the lug 12 and the top surface 63 of the wall 64 on the distal end 62 of the shaft 58. Once the cap 36 is tightened onto the shaft 58, this friction is sufficient to prevent the lug 12 from rotating about the lug axis 16 when a microphone accessory is threaded on to or off of the first post 24 when the lug 12 is in the first orientation 74, and on to or off of the second post 30 when the lug 12 is in the second orientation 76.

Referring to FIGS. 2-6, the first opening diameter 50 of the cap 36 is greater than the first post diameter 26 of the lug 12 so that when the lug 12 is disposed in the bore 46 of the cap 36 in a first orientation 74 as shown in FIG. 6B, the first post 24 extends through the first opening 48 of the cap 36. The bore diameter 70 of the shaft 58 is greater than the second post diameter 32 so that when the lug 12 is disposed in the bore 46 of the cap 36 in the first orientation 74, and the cap 36 is mated to the shaft 58, the second post 30 extends into the bore 66 of the shaft 58. The first opening diameter 50 is greater than the second post diameter 32 so that when the lug 12 is disposed in the bore 46 of the cap 36 in a second orientation 76 as shown in FIG. 6C, the second post 30 extends through the first opening 48 of the cap 36. The bore diameter 70 of the shaft 58 is greater than the first post diameter 26 so that when the lug 12 is disposed in the bore 46 of the cap 36 in the second orientation 76, and the cap 36 is mated to the shaft 58, the first post 30 extends into the bore 66 of the shaft 58. In other embodiments, the lug 12 is disposed in the bore 46 of the cap 36 in the first orientation 74, and the threaded portion 28 of the first post 24 is threadably mated with an internal threaded portion of a microphone accessory. The threaded portion 28 of the first post 24 and the internal threaded portion of the microphone accessory are ⅜"-16 threads per inch. A washer 80 can be disposed around the first post 24 and between the cap 36 and the microphone accessory so that when the microphone accessory is threadably mated to the first post 24, the washer 80 is compressed between the cap 36 and the microphone accessory. The washer 80 has a 25 mm diameter. In other embodiments, when the lug 12 is disposed in the bore 46 of the cap 36 in the second orientation 74, the threaded portion 34 of the second post 30 is threadably mated with an internal threaded portion of a microphone accessory. The threaded portion 34 of the second post 30 and the internal threaded portion of the microphone accessory are ⅝"-27 threads per inch. A washer 80 can be disposed around the second post 30 and between the cap 36 and the microphone accessory so that when the microphone accessory is threadably mated to the second post 30, the washer 80 is compressed between the cap 36 and the microphone accessory. The washer 80 has a 25 mm diameter. In yet other embodiments, the first post diameter 26 is equal to the second post diameter 32. The first post diameter 26 and second post diameter 32, as well as the first post length 82 and the second post length 84, may be set to any length, including in accordance with any standard known by those of skill in the art familiar with the present disclosure. Similarly, any thread standard known to those of skill in the art may be used for the first post 24 and the second post 30.

Referring to FIGS. 6A-6C, during use of the adapter 10, the lug 12 is placed inside the cap 36 in a first orientation 74. The cap 36 is then threadably mated to the shaft 58 such that the lug 12 is locked down tight, meaning that the lug 12 does not rotate about the lug axis 16 while threading and unthreading a microphone accessory to the first post 24. Once the lug 12 is locked in place, the microphone accessory is mated to the first post via internal threading of the microphone accessory. In particular, the first post has ⅜"-16 threads per inch threading and thus mates with a microphone accessory having the same threading. If a user desires to thread a microphone accessory having a different type of threading, the lug 12 is placed inside the cap 36 in a second orientation 76. The cap 36 is then threadably mated to the shaft 58 such that the lug 12 is locked down tight. Once the lug 12 is locked down tight, the microphone accessory having a different type of threading is mated to the second post via internal threading of the microphone accessory. In particular, the second post has ⅝"-27 threads per inch threading and thus mates with a microphone accessory having the same threading. In other embodiments, the cap 36 mates with shaft 58 by any method known by those of skill in the art and familiar with the present disclosure.

The adapter 10 offers several advantages. Among other things, the adapter 10 allows a microphone accessory having ⅜"-16 threads per inch threading to be mated with shaft 58, and the adapter 10 also allows a microphone accessory having ⅝"-27 threads per inch threading to be mated with shaft 58. The adapter 10 is particularly advantageous in that only one adapter 10 is needed to perform both of these functions. Further, the adapter 10 is able to lock the lug 12 in tightly so that the microphone accessory may be threaded on and off the microphone stand without the lug 12 rotating about the lug axis 16 relative to the shaft 58.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. An adapter for connecting an upper shaft of a microphone stand to a microphone accessory, comprising:
 a lug having a body extending along a lug axis between a first end and a second end and having a body diameter in a plane perpendicular to the lug axis, a first post extending from the first end having a first post diameter in a plane perpendicular to the lug axis and having a threaded portion, a second post extending from the second end having a second post diameter in a plane perpendicular to the lug axis and having a threaded portion;
 a cap extending along a cap axis between a first end and a second end, the cap having a wall defining a bore extending in a direction of the cap axis, the first end defining a first opening in communication with the bore and having a first opening diameter, the second end defining a second opening in communication with the bore and having a second opening diameter, the wall having an internal threaded portion;
 a shaft extending along a shaft axis and having a distal end, the shaft having a wall defining a bore extending from an opening in the distal end of the shaft in a direction of the shaft axis and having a shaft bore diameter, an external surface of the shaft having an external threaded portion proximate to the distal end of the shaft adapted to threadably engage with the internal threaded portion of the cap when the distal end of the shaft is received in the bore of the cap through the second opening of the cap;

the body diameter of the lug is greater than the first opening diameter of the cap and is greater than the bore diameter in the distal end of the shaft, so that when the lug is disposed between the cap and the shaft, and the shaft is threadably engaged with the cap, the lug is compressed between the distal end of the shaft and the first end of the cap so that the lug is rotatably fixed about the lug axis relative to the shaft.

2. The adapter of claim 1, wherein the first opening diameter is greater than the first post diameter so that when the lug is disposed in the bore of the cap in a first orientation, the first post extends through the first opening of the cap.

3. The adapter of claim 2, wherein the shaft bore diameter is greater than the second post diameter, so that when the lug is disposed in the bore of the cap in the first orientation, and the cap is mated to the shaft, the second post extends into the bore of the shaft.

4. The adapter of claim 3, wherein the first post diameter is equal to the second post diameter.

5. The adapter of claim 3, wherein the first opening diameter is greater than the second post diameter so that when the lug is disposed in the bore of the cap in a second orientation, the second post extends through the first opening of the cap.

6. The adapter of claim 5, wherein the shaft bore diameter is greater than the first post diameter, so that when the lug is disposed in the bore of the cap in the second orientation, and the cap is mated to the shaft, the first post extends into the bore of the shaft.

7. The adapter of claim 6, wherein the lug is disposed in the bore of the cap in the first orientation, and the threaded portion of the first post is threadably mated with an internal threaded portion of a first microphone accessory.

8. The adapter of claim 7, wherein the threaded portion of the first post and the internal threaded portion of the first microphone accessory are ⅜"-16 threads per inch.

9. The adapter of claim 8, wherein a first washer is disposed around the first post and between the cap and the first microphone accessory, so that when the first microphone accessory is threadably mated to the first post the first washer is compressed between the cap and the first microphone accessory.

10. The adapter of claim 9, wherein the lug is disposed in the bore of the cap in the second orientation, and the threaded portion of the second post is threadably mated with an internal threaded portion of a second microphone accessory.

11. The adapter of claim 10, wherein the threaded portion of the second post and the internal threaded portion of the second microphone accessory are ⅝"-27 threads per inch.

12. The adapter of claim 11, wherein a second washer is disposed around the second post and between the cap and the second microphone accessory, so that when the second microphone accessory is threadably mated to the second post the second washer is compressed between the cap and the second microphone accessory.

13. An adapter for connecting a microphone shaft to a microphone accessory, comprising:

a lug having a body extending along a lug axis between a first end and a second end and having a body diameter in a plane perpendicular to the lug axis, a first post extending from the first end having a first post diameter in the plane perpendicular to the lug axis and having a threaded portion, a second post extending from the second end having a second post diameter in the plane perpendicular to the lug axis and having a threaded portion;

a cap extending along a cap axis between a first end and a second end, the cap having a wall defining a bore extending in a direction of the cap axis and having a bore diameter, the first end defining a first opening in communication with the bore and having a first opening diameter, the second end defining a second opening in communication with the bore and having a second opening diameter, the wall having an internal threaded portion;

the body diameter of the lug is greater than the first opening diameter of the cap and is less than the bore diameter of the cap so that the lug may be inserted into the bore of the cap through the second opening of the cap and the body of the lug is pressed against the first end of the cap.

14. The adapter of claim 13, wherein the first opening diameter is greater than the first post diameter so that when the lug is disposed in the bore of the cap in a first orientation, the first post extends through the first opening of the cap.

15. The adapter of claim 14, wherein the first opening diameter is greater than the second post diameter so that when the lug is disposed in the bore of the cap in a second orientation, the second post extends through the first opening of the cap.

16. The adapter of claim 15, wherein the lug is disposed in the bore of the cap in the first orientation, and the threaded portion of the first post is threadably mated with an internal threaded portion of a first microphone accessory.

17. The adapter of claim 16, wherein the threaded portion of the first post and the internal threaded portion of the first microphone accessory are ⅜"-16 threads per inch.

18. The adapter of claim 17, wherein the lug is disposed in the bore of the cap in the second orientation, and the threaded portion of the second post is threadably mated with an internal threaded portion of a second microphone accessory.

19. The adapter of claim 18, wherein the threaded portion of the second post and the internal threaded portion of the second microphone accessory are ⅝"-27 threads per inch.

20. A method of using an adapter, comprising the steps of:

placing a lug inside of a cap in a first lug orientation or a second lug orientation, the lug having a body extending along a lug axis between a first end and a second end and having a body diameter in a plane perpendicular to the lug axis, a first post extending from the first end having a first post diameter in the plane perpendicular to the lug axis and having a threaded portion, a second post extending from the second end having a second post diameter in the plane perpendicular to the lug axis and having a threaded portion, the cap extending along a cap axis between a first end and a second end, the cap having a wall defining a bore extending in a direction of the cap axis, the first end defining a first opening in communication with the bore and having a first opening diameter, the second end defining a second opening in communication with the bore and having a second opening diameter, the wall having an internal threaded portion, the first post extending through the first opening of the cap when the lug is in the first lug orientation, the second post extending through the first opening of the cap when the lug is in the second lug orientation;

threadably mating the cap to a shaft, the shaft extending along a shaft axis and having a distal end, the shaft having a wall defining a bore extending from an opening in the distal end of the shaft in a direction of the shaft axis and having a shaft bore diameter, an external surface of the shaft having an external threaded portion proximate to the distal end of the shaft adapted to threadably engage with the internal threaded portion of the cap when the distal end of the shaft is received in the bore of the cap through the second opening of the cap, the body diameter of the lug being greater than the first opening diameter of the cap and being greater than the diameter of the bore in the distal end of the shaft, so that when the lug is disposed between the cap and the shaft, and the shaft is threadably engaged with the cap, the lug is compressed between the distal end of the shaft and the first end of the cap so that the lug is rotatably fixed about the lug axis relative to the shaft; and coupling a first microphone accessory to the lug, the cap, and the shaft when the lug is in the first lug orientation by threadably mating the threaded portion of the first post to an internal threaded portion of the first microphone accessory, or coupling a second microphone accessory to the lug, the cap, and the shaft when the lug is in the second lug orientation by threadably mating the threaded portion of the second post to an internal threaded portion of the second microphone accessory.

\* \* \* \* \*